(12) United States Patent
Kidokoro et al.

(10) Patent No.: US 6,898,220 B2
(45) Date of Patent: May 24, 2005

(54) GAS LASER MACHINING APPARATUS

(75) Inventors: Hitoshi Kidokoro, Tokyo (JP); Masato Matsubara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/875,289

(22) Filed: Jun. 25, 2004

(65) Prior Publication Data

US 2005/0002426 A1 Jan. 6, 2005

Related U.S. Application Data

(62) Division of application No. 09/045,824, filed on Mar. 23, 1998, now Pat. No. 6,765,936.

(30) Foreign Application Priority Data

Mar. 21, 1997 (JP) .............................................. 9-068208
Feb. 4, 1998 (JP) ............................................ 10-022900

(51) Int. Cl.$^7$ ................................................. H91S 3/13
(52) U.S. Cl. .............................. 372/30; 372/25; 372/29; 372/57
(58) Field of Search ................................ 372/30, 25, 29

(56) References Cited

U.S. PATENT DOCUMENTS 5,463,650 A * 10/1995 Ito et al. ........................ 372/57
RE38,054 E * 4/2003 Hofmann et al. .............. 372/25

* cited by examiner

*Primary Examiner*—Mingun Oh Harvey
*Assistant Examiner*—Dung Nguyen
(74) *Attorney, Agent, or Firm*—Sughrue Mion, PLLC

(57) ABSTRACT

In a gas laser machining apparatus based on a pulse laser oscillation, a mis-pulse-preventing pulse, viz., a preparatory pulse component whose energy is below the threshold value of a laser oscillation, is located prior to a first pulse of discharging power pulses.

1 Claim, 6 Drawing Sheets

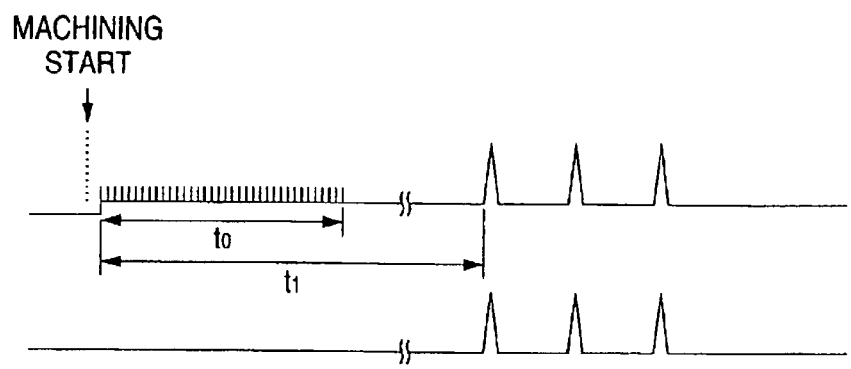
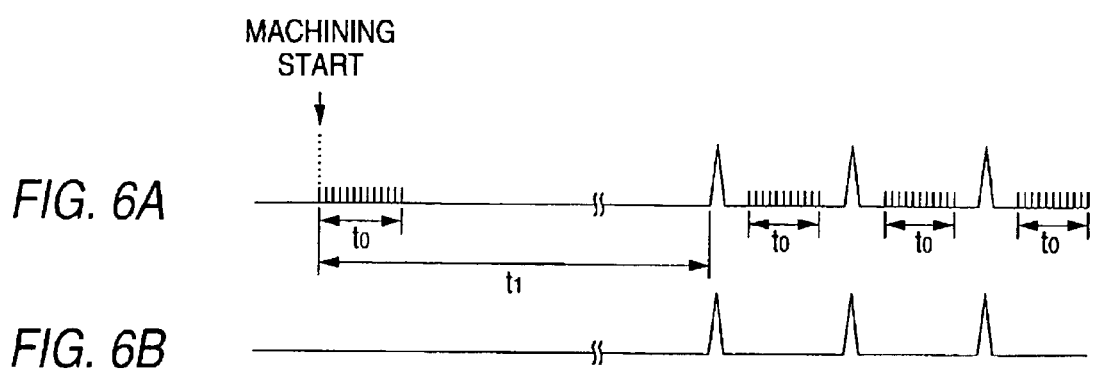

FIG. 9A  INPUT POWER WAVEFORM 
FIG. 9B  NORMAL LASER OUTPUT WAVEFORM 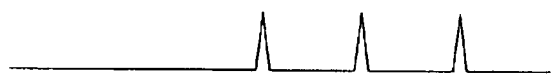
FIG. 9C  POWER WAVEFORM WITH MIS-PULSE 
FIG. 9D  LASER OUTPUT WAVEFORM WITH MIS-PULSE 

GAS LASER MACHINING APPARATUS

CROSS REFERENCE TO RELATED APPLICATIONS

This is a divisional of application Ser. No. 09/045,824, filed Mar. 23, 1998 now U.S Pat. No. 6,765,936; the disclosure of which is incorporated herein by reference.

BACKGROUND OF THE INVENTION

1. Field of the Invention

The present invention relates to a gas laser machining apparatus, for example, a $CO_2$ laser machining apparatus, and more particularly to a technique that enables laser piercing by a stable pulse laser.

2. Description of the Relate Art

In piercing fine apertures by the $CO_2$ laser, the pulse laser piercing conditions contain the number of pulses which determines how many laser pulses are irradiated onto each aperture location, in addition to pulse energy, pulse peak, pulse width and so on. The number of pulses irradiated on one piercing location is several pulses at the maximum although being dependent on the material, thickness, etc., of a workpiece. Therefore, one mis-pulse seriously adversely affects the piercing result.

In a conventional pulse control, a laser output shown in FIG. 9B is obtained when an input power waveform shown in FIG. 9A is applied to a laser device. As disclosed in Japanese Patent Unexamined Publication No. Sho 63-7688, when a base power is added to the power waveform as shown in FIG. 9A, the laser pulses are improved in their leading and trailing characteristics and stability. However, it is difficult to stabilize the discharging state immediately after a discharge of energy is made. As a result, it has been recognized that a pulse first generated by the laser device becomes a mis-pulse of a low peak once per four times, as shown in FIG. 9C, although infrequently. Therefore, there is a case where a lower number pulses than the set number of pulses for other aperture locations are irradiated on a first aperture location immediately after the piercing process starts.

A process of piercing a fine aperture using the laser pulses in conventional gas laser machining device is conducted as described above, and because it is necessary to irradiate laser pulses of a set number on the respective aperture location, there is a risk that the occurrence of a mis-pulse leads to piercing failure. Therefore, it is helpful to provide the oscillation of laser pulses which is stabilized without any mis-pulse.

SUMMARY OF THE INVENTION

The present invention has been made to solve the above problems with the prior art, and therefore an object of the present invention is to provide a gas laser machining apparatus which ensures a stable pulse laser oscillation without producing mis-pulses, to thereby realize piercing of fine apertures.

To achieve the above object, according to the present invention, there is provided a gas laser machining apparatus that conducts a pulse laser oscillation, a preparatory pulse component whose energy is below a threshold value of a laser oscillation, is located prior to a first pulse of discharging pulses.

Also, according to the invention, a base power whose energy is below the threshold value of laser oscillation is added during the machining operation, and a preparatory pulse component whose energy is below the threshold value of laser oscillation is located prior to a first pulse of the discharging pulses.

Further, according to the invention, a preparatory pulse component whose energy is below the threshold value of laser oscillation is continuously applied before laser pulses used for machining are generated and in each of the intervals between the adjacent pulses used for machining.

Still further, according to the invention, a preparatory pulse component whose energy is below the threshold value of a laser oscillation is applied for a given period prior to the respective pulses used for machining.

Yet still further, according to the invention, a laser beam is scanned so that a first pulse of laser pulses is prevented from being irradiated to a workpiece.

BRIEF DESCRIPTION OF THE DRAWINGS

FIGS. 4A and 4B are waveform diagrams showing an input power pulse waveform and a laser output waveform according to a embodiment 2 of the invention;

FIGS. 5A and 5B are waveform diagrams showing an input power pulse waveform and a laser output waveform according to a embodiment 3 of the invention;

FIGS. 6A and 6B are waveform diagrams showing an input power pulse waveform and a laser output waveform according to a embodiment 4 of the invention;

FIGS. 9A to 9D are waveform diagrams showing an input power pulse and a laser output waveform under a conventional control.

DETAILED DESCRIPTION OF THE PREFERRED EMBODIMENTS

Now, a description will be given in more detail of preferred embodiments of the present invention with reference to the accompanying drawings.

Figure 1:
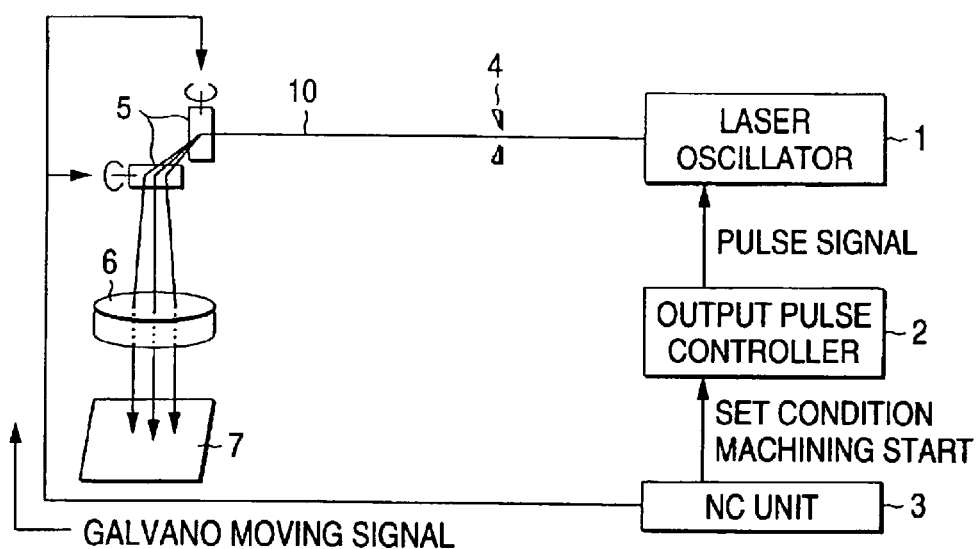
FIG. 1 is a diagram showing a basic arrangement of a gas laser machining apparatus for piercing fine apertures according to an embodiment 1 of the present invention.

A basic arrangement of a gas laser machining apparatus according to an embodiment of the present invention is shown in FIG. 1. FIG. 1 is a diagram showing a $CO_2$ laser machining apparatus for machining printed circuit boards. A portion that oscillates a pulsed laser beam is made up of laser oscillator 1, an output pulse controller 2 and an NC unit 3. When set conditions such as a pulse width, a pulse peak and the number of pulses are inputted to the NC unit 3 according to conditions such as the material and the thickness of a printed board to be machined and the required diameter of apertures, an output machining start signal is directed to the output pulse controller 2. In response thereto, a pulse signal is outputted to the laser oscillator 1 from the output pulse controller 2, thereby making the laser oscillator 1 oscillate a pulse laser beam.

A pulsed laser beam 10 outputted from the laser oscillator 1 is passed through an image transfer mask 4 and aimed at a target location to be pierced on a workpiece by a galvano scan mirror 5. Thereafter, an image of the mask 4 is transferred/condensed by an f? lens 6 before it is irradiated onto a substrate 7 to be machined. While optics consisting of the image transfer mask 4, the galvano scan mirror 5 and the f? lens 6 is employed in the embodiment, the optics of the present invention is not limited to these image transfer optics, and the scan optics based on the galvano scan mirror.

Figure 2A:
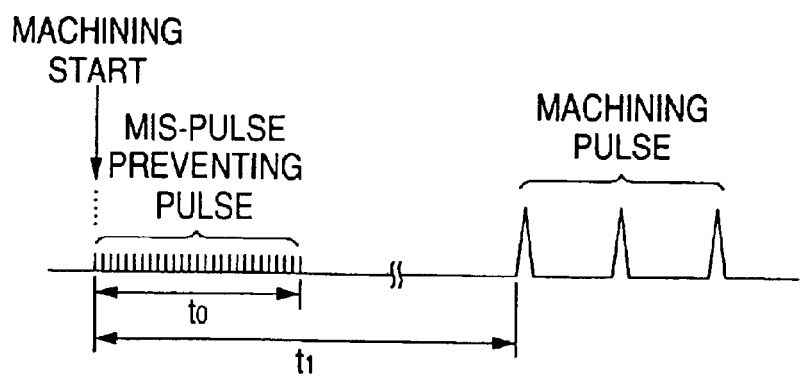
FIGS. 2A and 2B are waveform diagrams showing an input power pulse waveform and a laser output waveform according to the embodiment 1 of the invention.
Figure 2B:
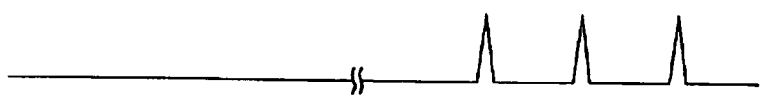

FIGS. 2A and 2B show an example of an input power waveform and a laser output waveform obtained by that input power waveform. In a pulse laser oscillation of a $CO_2$ laser, a laser pulse first generated by the laser device immediately after the injection of discharging power is unstable in particular, and appears as a mis-pulse having a low peak, although infrequently. To cope with this, in the gas laser machining apparatus of the embodiment, a mis-pulse-preventing pulse, viz., a preparatory pulse component whose energy is below the threshold value of laser oscillation, is applied to a laser device contained therein for a duration of time t1 before a first pulse of the machining pulses. As a result, discharging energy immediately after the discharging power injection is more stabilized, to thereby prevent at least a first pulse generated by the laser device from becoming a mis-pulse.

Figure 3:
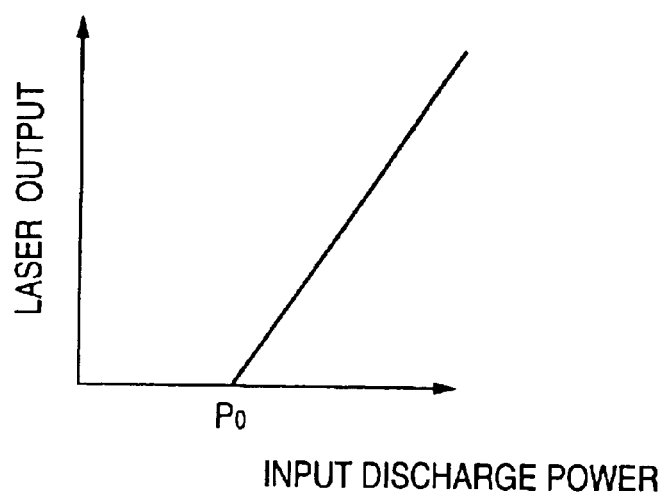
FIG. 3 is a graph showing an input vs. output characteristic of a $CO_2$ laser.

The threshold value is input discharging power value less than Po at which laser beam emission starts, as shown in FIG. 3 showing an input vs. output characteristic of a laser oscillation. As taught by the characteristic graph, the discharging operation immediately after the power injection can be increasingly stabilized without outputting of the laser beam, by applying a preparatory pulse, viz., a preparatory pulse component whose energy is below the threshold value Po of a laser oscillation to the laser device before a first pulse of those pulses when machining is applied thereto.

As an example of a frequency of a preparatory pulse component to be applied, an application timing of the preparatory pulse component and its application duration is: a preparatory pulse component which is below the laser oscillation threshold value and whose frequency is 1 kHz, and whose application timing is 150 µs before the pulses used for machining, are applied for a duration of 150 µs.

A second embodiment of the invention will be described. The structure of the apparatus is substantially identical with those of the embodiment 1. FIGS. 4A and 4B show an example of an input power waveform and a laser output waveform obtained by the input power waveform according to this embodiment.

As known, when a base power which is below the oscillation threshold value of the laser beam is added to each of the intervals between the adjacent pulses, the stability of the pulses is improved. However, a pulse first generated by the laser device immediately after the injection of discharging power is still unstable even if the base power is added, which frequently causes the occurrence of mis-pulses. To cope with this, in the gas laser machining apparatus of this embodiment, to improve the stability of all the pulses used for machining, in addition to a base power, a preparatory pulse component whose energy is below the threshold value of a laser oscillation, is applied to the laser device contained therein for a duration of time t1, a time t1 before a first pulse of the machining pulses is applied thereto. By so doing, it is possible to prevent at least a pulse first generated by the laser device from becoming a mis-pulse, and the subsequent pulses are stabilized.

The preparatory pulse to be given, and the pulse application timing and its application period may be the same as in the first embodiment. To this, a base power which is below the laser oscillation threshold value is added. The invention is not particularly limited to these conditions, and preparatory pulses may be generated in other ways with the same effects.

A third embodiment of the invention will now be described. The structure of this embodiment is substantially identical with that of the first embodiment. FIGS. 5A and 5B are an example of an input power waveform according to this embodiment and a laser output waveform obtained by the input power waveform. This embodiment makes use of the fact that the preparatory pulse component rather than the base power, when added, more effectively prevents the mis-pulse from being formed. In this embodiment, preparatory pulse components are used in place of the base power added to the input power in the prior art of FIG. 9. In this embodiment, not only the first pulse but also the subsequent pulses are prevented from being transformed into mis-pulse.

The conditions such as frequency of the preparatory pulse component to be applied, and the timing of the preparatory pulse component and its application duration may be the same as the first embodiment although the invention is not particularly limited to those conditions.

A fourth embodiment of the invention will now be described. The structure of this embodiment is substantially identical with that of the first embodiment. FIGS. 6A and 6B are examples of an input power waveform according to this embodiment, and a laser output waveform obtained by that input power waveform, respectively. In the fourth embodiment, preparatory pulse components, each continuing for a duration of t0, are located before the machining pulses of the discharging power, respectively, as shown. The embodiment can prevent all the machining pulses from being transformed into mis-pulses.

The conditions such as frequency of the preparatory pulse component to be applied, and the timing of the preparatory pulse component and its application duration may be the same as in the first embodiment although the invention is not particularly limited to those conditions.

Figure 7A:
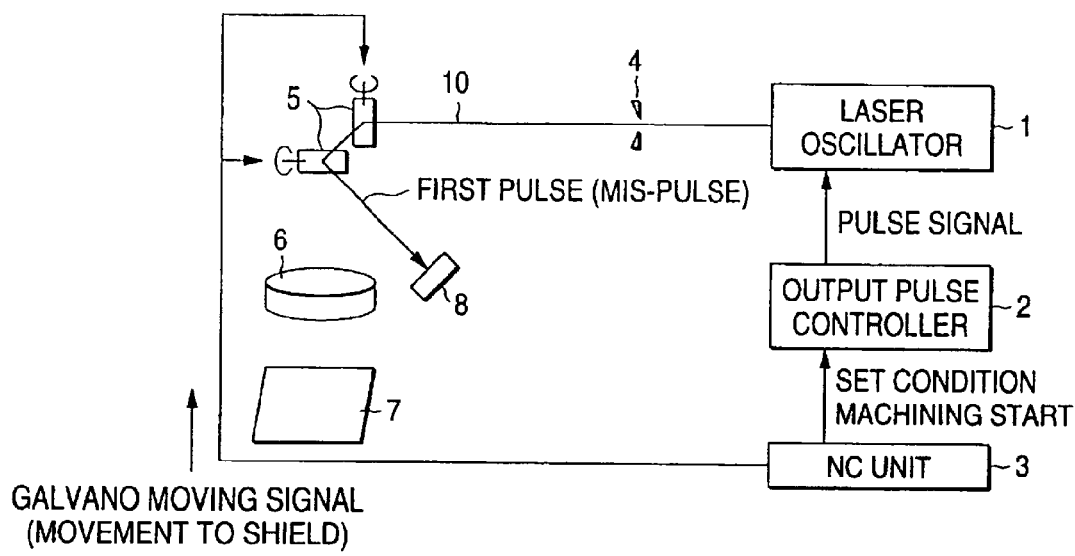
FIGS. 7A and 7B are diagrams showing a basic arrangement of a gas laser machining apparatus for piercing fine apertures according to an embodiment 5 of the present invention.
Figure 7B:
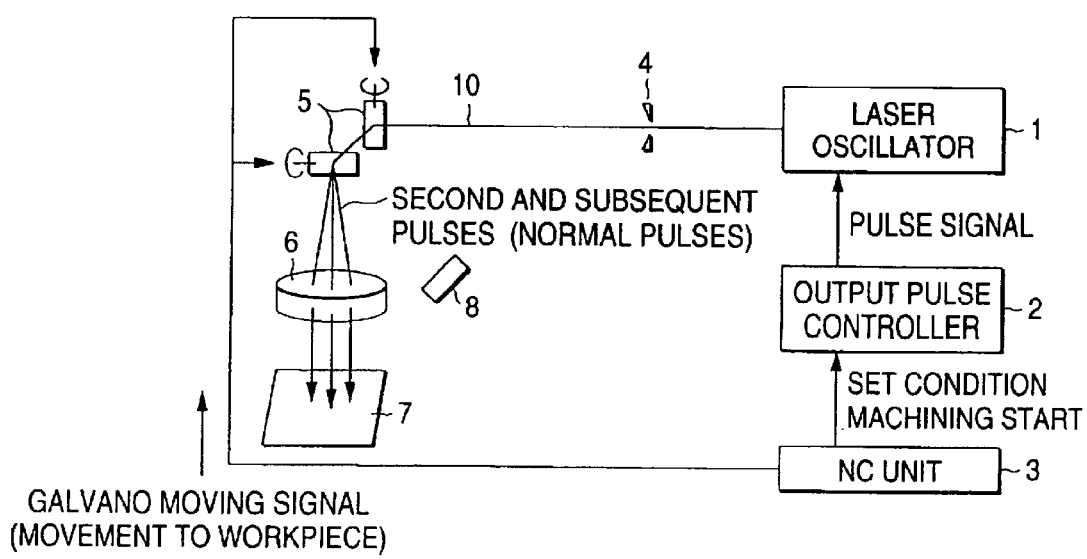

A fifth embodiment of the invention will be described. FIGS. 7A and &B are schematic diagrams for explaining this embodiment. The structure of this embodiment adds a damper for damping a laser beam to structure of the first embodiment. To cope with a mis-pulse possibly caused by discharge instability immediately after the injection of discharging energy, a galvano scan mirror 5 is scanned by the NC unit 4 to irradiate at least a first pulse onto a shield such as the damper 8 as shown in FIG. 7A, with the subsequent stable pulsed laser beam being irradiated onto the workpiece 7 as shown in FIG. 7B.

Figure 8A:
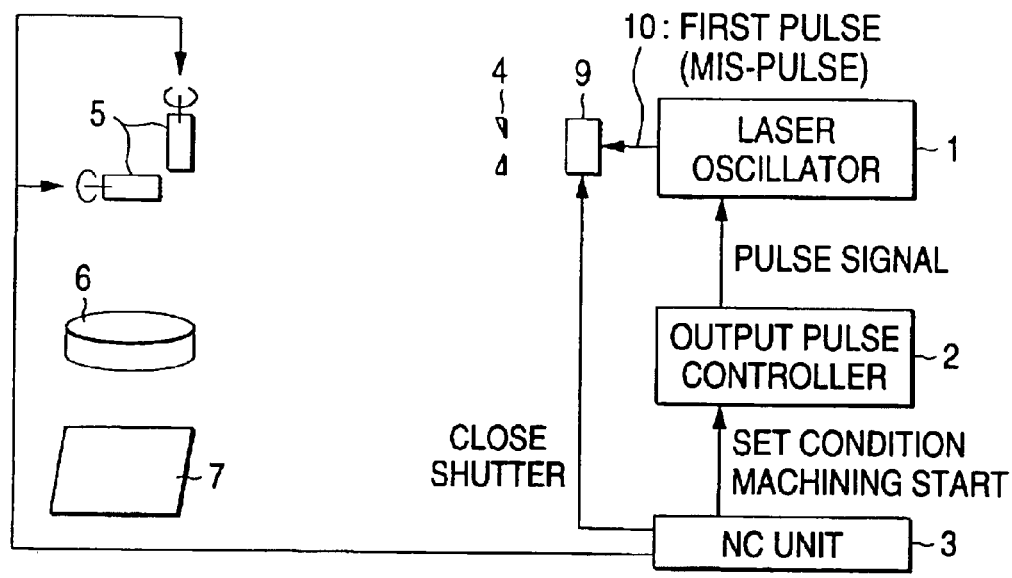
FIGS. 8A and 8B are diagrams showing a basic arrangement of a gas laser machining apparatus for piercing fine apertures according to an embodiment 6 of the present invention.
Figure 8B:
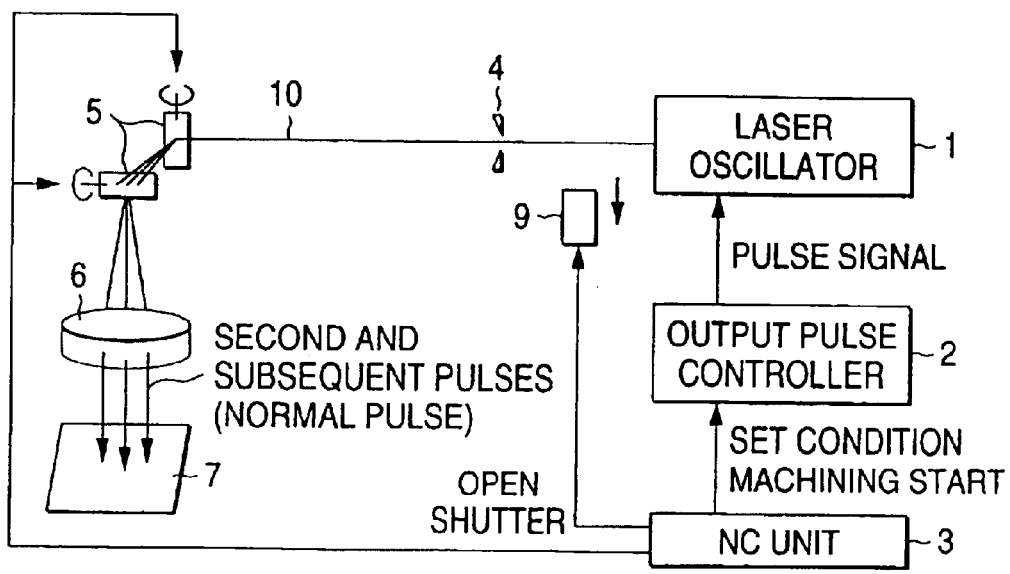

A sixth embodiment of the invention will be described FIGS. 8A and 8B are schematic diagrams for explaining this embodiment. This embodiment adds a high-speed shutter for shielding a laser beam to the structure of the first embodiment. To cope with a mis-pulse possibly caused by discharge instability immediately after the injection of discharging energy, at least a first pulse is shielded by controlling the high-speed shutter 9 using the NC unit 3 as shown in FIG. 8A, with the subsequent stable pulsed laser beam being irradiated onto the workpiece 7 as shown in FIG. 8B.

While the $CO_2$ laser is used in the embodiments thus far described, an excimer laser, a helium neon laser or the like, in place of the $CO_2$ laser, may be used for the invention.

The present invention thus constructed has the following useful effects.

Through electrical control of a discharging power waveform, the invention succeeds in suppressing a mispulse that otherwise would appear at the location of a first laser pulse, and alternatively uses various control mechanisms to stabilize the first and/or subsequent pulses, or shunts a mispulse to a damper. Therefore, the gas laser machining apparatus of the invention can stably drill apertures with a drilling time comparable with that of the conventional machine.

Further, the electrical power consumed by the apparatus is reduced compared to the conventional system.

What is claimed is:

1. A gas laser machining apparatus, comprising:

an oscillator for conducting a pulse laser oscillation; and a pulse controller for controlling laser oscillation;

wherein said pulse controller outputs to said oscillator a base power level whose energy is below the threshold value for laser oscillation, and adds to said base power level a preparatory pulse component whose energy is below the threshold value for laser oscillation, prior to delivering to said oscillator a first of a series of discharging power pulses.

* * * * *